United States Patent [19]

Rustebakke

[11] Patent Number: 5,641,223

[45] Date of Patent: Jun. 24, 1997

[54] HORTICULTURE LAMP

[75] Inventor: Susan K. Rustebakke, Madison, Wis.

[73] Assignee: Tetrad, Inc., Madison, Wis.

[21] Appl. No.: 237,858

[22] Filed: May 4, 1994

[51] Int. Cl.⁶ ............................................. F21P 1/02
[52] U.S. Cl. ...................... 362/122; 362/407; 362/420; 362/805
[58] Field of Search .................... 362/122, 285, 362/391, 403, 404, 407, 428, 805, 410, 457

[56] References Cited

U.S. PATENT DOCUMENTS

| D. 63,126 | 10/1923 | Toothaker . |
| D. 86,987 | 2/1932 | Laws . |
| D. 103,928 | 6/1937 | Read, Jr. . |
| 262,379 | 8/1882 | Dean . |
| D. 328,361 | 7/1992 | Paproski . |
| 531,809 | 1/1895 | Schafer . |
| 846,563 | 3/1907 | Hanwell . |
| 1,348,949 | 8/1920 | Johansson . |
| 2,300,776 | 11/1942 | Collins . |
| 2,993,300 | 7/1961 | Sawyer . |
| 3,061,717 | 10/1962 | Barrett . |
| 4,287,682 | 9/1981 | Browne . |
| 4,299,054 | 11/1981 | Ware . |
| 4,441,145 | 4/1984 | Antkowiak . |
| 4,803,666 | 2/1989 | Rotter ........................ 362/418 |
| 4,950,166 | 8/1990 | Williams . |
| 5,034,865 | 7/1991 | Sonneman . |
| 5,065,294 | 11/1991 | Poot, Jr. . |

FOREIGN PATENT DOCUMENTS

| 0203099 | 4/1959 | Denmark ........................ 362/122 |
| 0071849 | 8/1959 | France ............................ 362/410 |
| 0457427 | 3/1928 | Germany ........................ 362/403 |
| 0052987 | 11/1910 | Switzerland .................... 362/403 |

Primary Examiner—Denise L. Gromada
Assistant Examiner—Y. Quach
Attorney, Agent, or Firm—Teresa J. Welch; Stroud, Stroud, Willink, Thompson & Howard

[57] ABSTRACT

A compact portable horticultural lamp that is easily assembled and disassembled. The lamp consists of a stand, lamp assembly, including a lamp housing and reflector shade, and a lamp assembly adjuster for raising and lowering the lamp assembly. The base of the stand forms an area in which a plant growth environment can be placed. The plant growth environment suitably includes seeds, a growing medium, plant containers, and a watering system, including a water reservoir and wicking mat.

21 Claims, 10 Drawing Sheets

HORTICULTURE LAMP

TECHNICAL FIELD

This invention relates generally to lighting systems and specifically, to a portable, demountable lamp. The invention is particularly well-suited as horticultural illumination for indoor plant growing environments. The invention also relates to a kit of a dismountable lamp and a growing environment.

BACKGROUND OF THE INVENTION

The growing of plants indoors has been long practiced, and much equipment, such as stands, trays, full spectrum lights, etc., and techniques are commercially available. Most of this equipment is quite efficient for indoor growing but is bulky and expensive. Even the most compact system may cost a few hundred dollars. For those with limited space, e.g., apartment dwellers, and/or limited resources, e.g., elementary schools, such equipment and systems are not feasibly acquired. Thus, a vexatious problem, largely unattended by the prior art, is the lack of practical, compact and inexpensive methods, techniques and equipment for indoor horticulture.

Key to indoor horticulture is, of course, the use of lamps. There are many known designs for lamps, that may be suitable for indoor horticultural use. See, for example, U.S. Design Pat. No. 63,126 issued to Toothaker; U.S. Pat. No. 1,348,949 issued to Johansson; U.S. Pat. No. 5,034,865 issued to Sonneman; and U.S. Design Pat. No. 328,361 issued to Paproski. Other patents have described lighting systems specific for horticultural use. See, for example, U.S. Pat. No. 4,441,145 issued to Antkowiak and U.S. Pat. No. 5,065,294 issue to Poot, Jr.

Still other patents have described lighting which includes a means for raising and lowering the lamp. See, for example, U.S. Pat. No. 846,563 issued to Hanwell; U.S. Pat. No. 1,348,949 issued to Johansson; and U.S. Pat. No. 3,061,717 issued to Barrett.

Some patents have been directed to various lamp shade designs. See, for example, U.S. Design Pat. No. 103,928 issued to Read, Jr.; U.S. Design Pat. No. 86,987 issued to Laws; and U.S. Pat. No. 531,809 issued to Schafer.

Some patents have addressed specific techniques for indoor growing environments. See, for example, U.S. Pat. No. 262,379 issued to Dean; U.S. Pat. No. 2,300,776 issued to Collins; U.S. Pat. No. 2,993,300 issued to Sawyer; U.S. Pat. No. 4,287,682 issued to Browne; U.S. Pat. No. 4,299,054 issued to Ware; and U.S. Pat. No. 4,950,166 issued to Williams.

Complete indoor horticultural systems are commercially available from, e.g., Grower's Supply Company, Ann Arbor, Mich. Guidance for building a growing environment is also available from educational sources such as Bottle Biology Notes published by Kendall Hunt Publishing Co. of Dubuque, Iowa.

Notwithstanding the many known designs for lamps, lightings systems, lamp shades and indoor planters and growing environments, the art has still not adequately responded to date with the introduction of a compact, inexpensive system suitable for those with limited space and budgets.

SUMMARY OF THE INVENTION

The present invention provides a compact, lightweight, demountable lamp suitable for indoor horticulture. The lamp is specifically configured to present a height-adjustable light source above a defined space for a planter or growing environment. In the illustrated embodiment, the lamp is suitably constructed from standard plumbing and electrical parts, thus making it inexpensive and very cost effective to manufacture.

The foregoing, and other advantages of the present invention, are realized in one aspect thereof in a horticultural lighting system for sustaining indoor plant growth which includes a housing, an electrical power cord, a lamp assembly and a lamp height adjuster. The housing is configured to present the lamp assembly above a defined planter space. The housing has an interior bore therethrough, and first and second openings for communicating the bore to the exterior of housing, the first opening being at a first end of the bore. The bore has a surface configured for receiving and passing the cord therethrough. The electrical cord is disposed axially within the bore, and has a first end extending from the first opening of the housing and an opposite end extending from the second opening of the housing. The lamp assembly is vertically positionally adjustable, and electrically connected to the cord. The lamp assembly depends from the first opening of the housing by hanging from the cord. The lamp assembly adjuster is operatively associated with the second opening of the housing, for adjusting the length of the cord within the housing, and thereby for adjusting vertically the position of the lamp assembly. The housing and the assembly are demountable, i.e., they can be easily and readily assembled and disassembled.

The lamp assembly further includes a bulb housing having a base portion configured to cooperate with a standard light fixture for retaining a bulb and to effect electrical connection between one end of the power cord and the fixture, and a reflector lamp shade of a predetermined shape spaced to overlie the bulb. The housing has an open end opposite the base portion into which the bulb is inserted and retained. The bulb is preferably a compact fluorescent bulb with an adapter so that a standard lighting fixture may be utilized and which can provide the intensity, spectrum and long life needed for horticulture applications.

In one aspect, the housing is a stand that is uprightly freestanding and includes a tube having a sidewall defining the bore which extends through the tube for receiving the electric power cord interiorly thereof as described hereinabove. The tube includes an upright member and a base member perpendicular to the upright member. The upright member includes a lower linear section and an upper inverted J-shaped section. The short leg of the J-shaped section is proximate the lamp assembly and the other leg is connected to the lower section. The base member is constructed of a spreader bar and two spaced apart parallel legs which extend perpendicularly from the ends of the spreader bar, respectively, and generally underlie the lamp assembly.

The adjuster is used to fix a portion of the length of the cord within the stand, and thereby acts as a means for raising and lowering the lamp assembly, and hence the light source. The adjuster in its simplest embodiment depends upon the frictional action developed between the cord and the surface of the bore of the housing. An indication of that action is measured as a coefficient of sliding friction of the cord relative to the bore. That coefficient is sufficient so that the lamp assembly height is adjustable and is maintained at any specified height by the frictional force. In an alternate embodiment, the adjuster includes a plug configured and dimensioned to fit into and close the second opening of the stand through which the cord exits the tube of the stand. The adjuster, thus, cooperates with the opening to hold fast the cord. Preferably, the plug is cylindrical in configuration and has an axial groove for receiving and holding fast said cord.

In the illustrated embodiment, the shade is formed of a plurality of panels which are annularly distributed in equal 360° fashion. The panels are substantially wedge-shaped or trapezoidal-shaped, each panel having a narrow end, a first side, a second side and a wider end. Each panel has a narrow end opening, which when the plurality of panels are superposed with the sides of adjacent panels overlapping and the narrow end opening supported over the open end of the housing, the panels are spread around to form the shade. Preferably the panels have small holes in the corners of the wide end, into which fasteners such as brads can be placed when the small openings of adjacent panels are superposed. The shade is substantially umbrella-shaped with a reflective inner side surface (i.e., bulb side surface).

In another aspect, the present invention is a kit suitable for sustaining indoor plant growth, which includes a lighting system, and further includes a compact plant growth environment. The lighting system includes a lamp assembly, a stand, and a lamp assembly adjuster as described hereinabove and in detail hereinafter.

The compact plant growth environment includes a stock of seeds, a growing medium, physical containers for plants, and a watering system to continually water plants in the containers. In the illustrated embodiment, the watering system includes a reservoir for water and a wicking mat for delivery water from the reservoir to the plant containers.

The kit includes directions for assembling the lighting system and setting up the growing environment and growing the seeds.

In a further aspect, the present invention is a method of making a horticultural lighting system. The method includes connecting a pair of hollow tubes, one of the pair being a J-shaped tube, the other of the pair being a linear tube; disposing a portion of an electric power cord within the J-shaped tube such that a first end of the cord exits the short leg of the J-shape; electrically connecting this end of the cord to a housing having a base portion configured to cooperate with a standard light fixture for retaining a light bulb; attaching a reflector lamp shade of a predetermined shape to the housing to overlie the bulb; providing an opening in the tubes so that the opposite end of the cord exits the tubes; closing the opening and holding fast the cord with a plug; and connecting perpendicularly the linear tube with a base. The base is suitably configured to define a space for placement of a planter(s) beneath the lamp assembly, i.e., beneath the light source.

The shade is formed by assembling a plurality of substantially trapezoidal-shaped panels, each panel having an narrow end opening; inserting the open end of the housing into the narrow end opening of the panels and securing the panels to the bulb housing; spreading circularly the panels about the bulb housing; and attaching the panels to one another at the wide end corners.

In a further aspect, the invention is a horticultural system that includes a demountable lighting system and a compact growing environment. The environment includes a water reservoir. The light system includes a light assembly and an upright stand which attaches to the water reservoir in a manner to present the light assembly above the environment.

The invention also provides a kit for a lighting system suitable for use with indoor plant growth that includes a lamp assembly, an electrical cord connectable to the lamp assembly for providing electrical power to the lamp assembly, a housing having a bore therethrough for receiving and passing the cord interiorly and a lamp assembly height adjuster for adjusting vertically the height of the lamp above a defined space. The lamp assembly is pendant from the housing by hanging from the cord.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which.

DETAILED DESCRIPTION

The present invention relates broadly to lighting systems. However, the lamp of the present invention is most particularly adapted for use in indoor plant growing environments. Accordingly, the present invention will now be described in detail with respect to such endeavors; however, those skilled in the art will appreciate that such a description of the invention is meant to be exemplary only and should not be viewed as limitative on the full scope thereof.

The present invention provides a compact, lightweight lamp that utilizes compact fluorescent bulbs that fit into a standard light fixture. The present invention is readily and easily disassembled and stored when not in use. The present invention is especially well suited for growing of plants in a limited space, for example, small apartments or elementary school classrooms, and in illustrated embodiments is configured and dimensioned to define a growing space and to present a light source above this growing space. These attributes are achieved through a novel combination of physical features.

Figure 1:
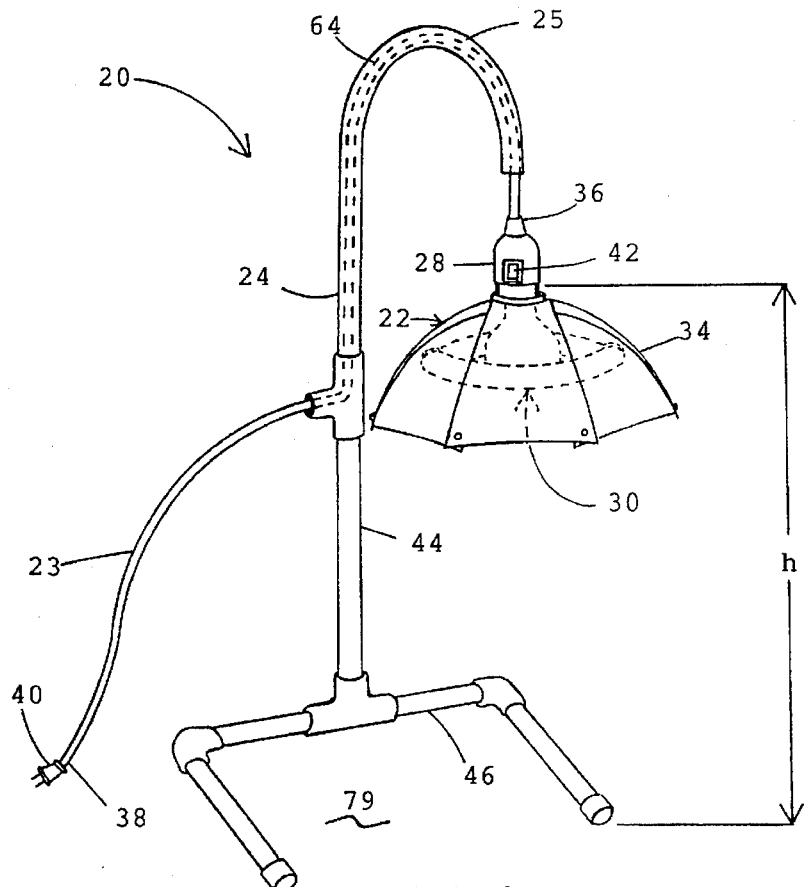
FIG. 1 is a perspective view of the lamp in accordance with the present invention.
Figures 2, 4:
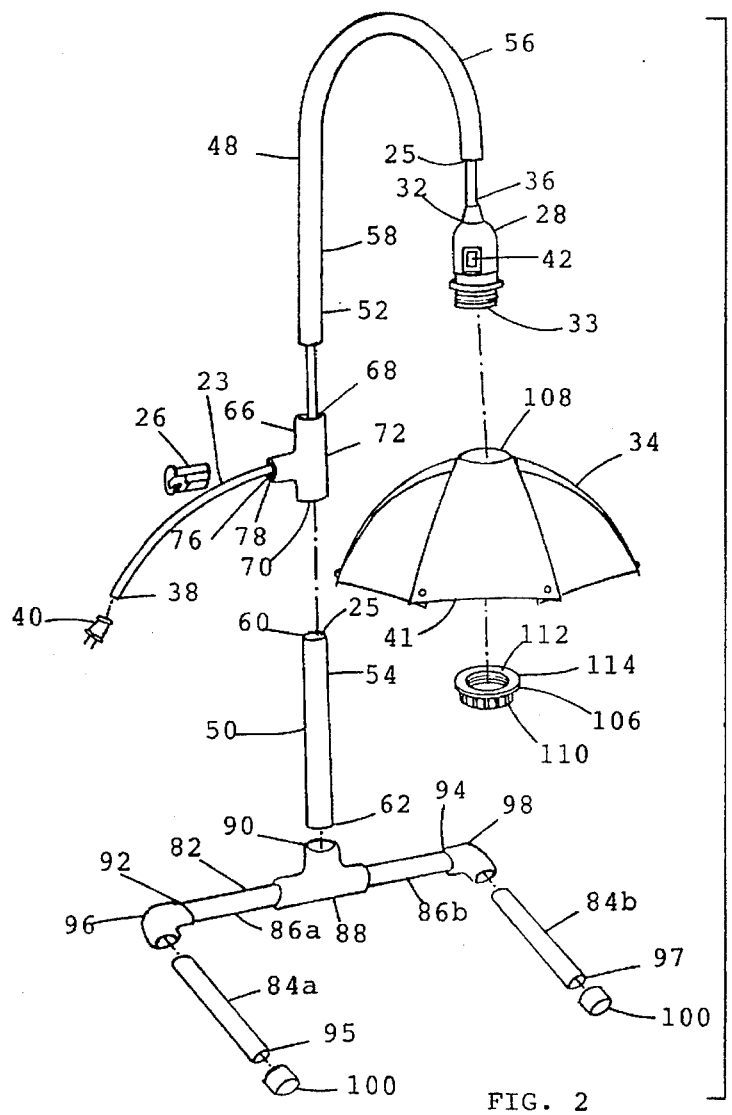
FIG. 2 is an exploded view of the lamp of FIG. 1.
FIG. 4 is a partial view of the lamp of FIG. 1 showing the shade.
Figure 5:
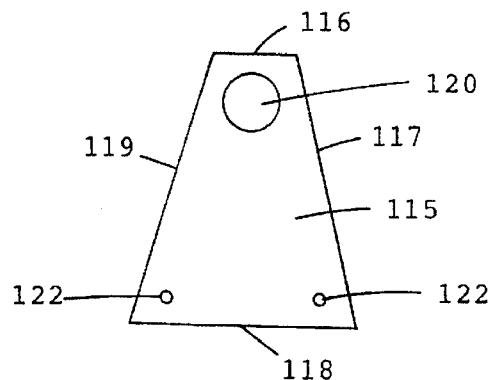
FIG. 5 is a top plan view of a shade panel of the shade of FIG. 4.
Figure 6:
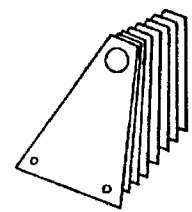
FIG. 6 is a perspective view of a plurality of shade panels that make up the shade of FIG. 4.

Reference is initially made to FIGS. 1, 2 and 4 depicting a lamp in accordance with the present invention and generally designated as 20. Lamp 20 generally includes a lamp assembly 22, an electrical power cord 23, and housing (or stand) 24. Each component of the lamp 20 is readily assembled and disassembled.

Lamp assembly 22 depends from housing 24 and includes a bulb housing 28 and a reflector shade 34. The bulb housing 28 has a base 32 and an open end 33 into which a bulb 30 is inserted, and has contained therein a standard light fixture (not shown), i.e., a conventional screw-type socket, including standard connections through the base 32 to a first end 36 of cord 23 to conduct electrical power to the bulb 30. The other, opposite end 38 of cord 23 is connected to a conventional electric plug 40 to be plugged in a conventional AC power outlet (not shown). Bulb housing 28 also includes an electric switch 42 for controlling the power to the bulb 30. Shade 34 overlies bulb 30, directing the light rays from bulb 30 away from the housing 28. Shade 34 includes a reflective inner surface 41.

In the illustrated embodiment, housing 24 includes an upright member 44 which is perpendicular to a base member 46. Upright member 44 and base member 46 are suitably hollow tubular members, i.e., each has a bore 25 therethrough. Upright member 44 includes an upper section 48, and a lower section 50. Upper section 48 and lower section 50 as hollow tubular members have sidewalls 52 and 54, respectively, defining the bore therethrough. Upper section 48 is substantially an inverted J-shape. Lower section 50 is substantially linear. Upper section 48 has a short-leg end 56 proximate the lamp assembly 22 and a longer leg end 58 that is remote from lamp assembly 22 and connected to the top end 60 of lower section 50. The bottom end 62 of lower section 50 is connected to base member 46. A portion 64 of cord 23 is contained within upper section 48, with a first end of cord 23 extending from end 56 of section 48.

Upper section 48 is joined to lower section 50 in any of many known ways, for example, the ends of each may be complementary in diameter and connected in mated fashion either threadedly or by compressional or frictional fitting. In the illustrated embodiment, as best seen in FIG. 2, upper section 48 and lower section 50 are connected via a T-joint 66. Use of T-joint 66 permits upper section 48 and lower section 50 to be connected and axially aligned, with the ends 68 and 70, respectively, fit into the straight bar portion 72 of the T-joint 66, leaving the third leg 74 of the T-joint 66 as an opening 76, i.e., as a sleeve 78 through which end 38 of cord 23 exits lamp 20 to be connected to a power source. While the illustrated embodiment shows the use of T-joint 66 to provide an exit for cord 23, it is understood that opening 76 for exiting of cord 23 may also be accomplished in many known ways, e.g., by a simple orifice in the sidewall 52 of upper section 48.

Base member 46 is horizontally disposed and lies on the surface upon which lamp 20 rests. In the illustrated embodiment, base member 46 is configured and dimensioned to define a space 79 for positioning a plant growing environment 80, that is, the growing environment is positioned below the lamp assembly 22, i.e., the light source. Base member 46 suitably includes a spreader bar 82 and two spaced apart parallel legs 84a and 84b attached perpendicularly to and in the same horizontal plane as bar 82. Spreader bar 82 has two linearly aligned portions 86a and 86b joined by a T-joint 88 with the third leg 90 connected to the bottom end 62 of lower upright section 50. Leg 84a is connected to one end 92 of bar 82 while leg 84b is connected to end 94 of bar 82. Legs 84 are conveniently connected to bar 82 via elbow joints 96 and 98, respectively. Spreader bar 82 and legs 84 are suitably hollow tubular members. As such, legs 84 are suitably fitted, each with an end cap 100 at their ends 95 and 97, respectively, remote from spreader bar 82.

The height of the lamp assembly 22 is adjustable above the surface upon which lamp 20 rests, more specifically above space 79, i.e., above the growing environment 80. As described above, cord 23 is attached to the base 32 of bulb housing 28 and a portion of cord 64 is contained within upper section 48 with an opposite end of cord 23 exiting lamp 20 through opening 76. By adjusting the portion 64 of cord 23 contained within upper section 48, the height "h" of lamp assembly 22 from the surface upon which the lamp rests may be adjusted. In its simplest embodiment, lamp assembly 22 is held above space 79 by frictional forces between the surface of cord 23 and the inside surface of upper section 48, i.e., the frictional force developed is sufficient to suspend and hold the lamp assembly. An indication of the frictional holding is measured as a coefficient of sliding friction of the cord 23 relative to the surface of upper section 48 (determined as the tangent of the angle of inclination to induce sliding). That coefficient may be greater than 0.2, preferably greater than 0.75, and even greater than 1.0. Judicious materials selection provides frictional action within the foregoing parameters.

Figure 3:
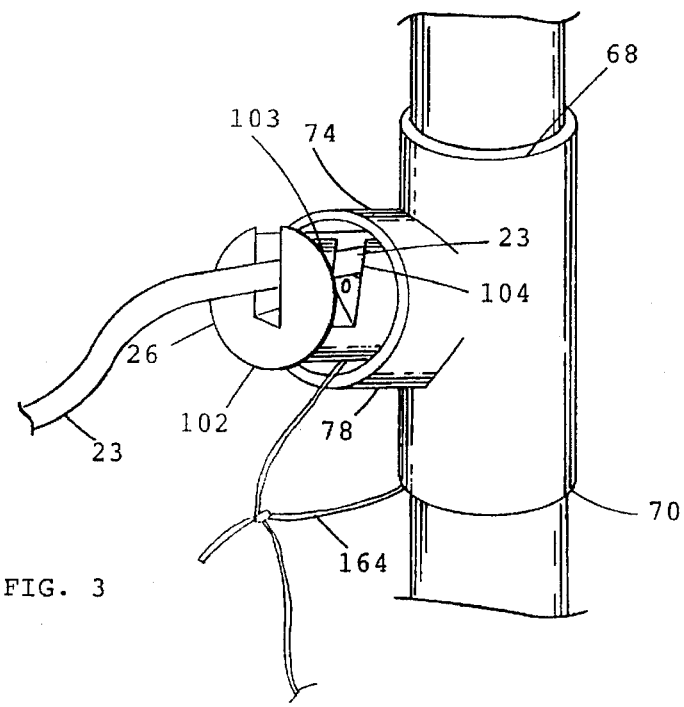
FIG. 3 is a partial perspective view of the lamp of FIG. 1 showing one embodiment of the electric cord adjuster with the electric cord adjuster partially removed and a string connecting the T-joint and the electric cord adjuster.
Figure 20:
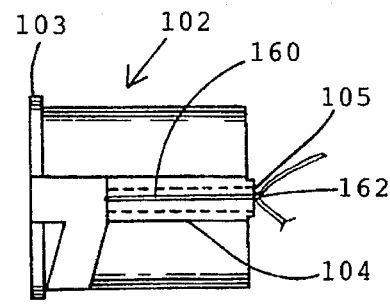
FIG. 20 is a top plan view of one embodiment of the lamp adjuster of FIG. 3 showing an optional string threaded through the plug and tied at one end.
Figure 21:
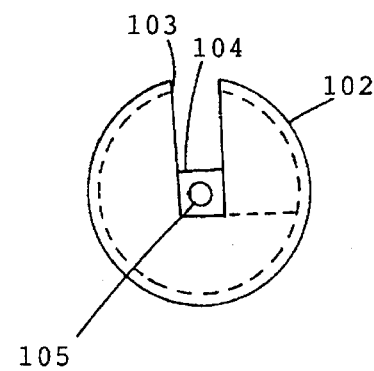
FIG. 21 is a left side view of the lamp adjuster of FIG. 3.

Alternatively, cord portion 64 is secured and held fast in section 48, by plugging opening 76 with an adjuster 26. As best seen in FIGS. 3, 20 and 21, adjuster 26 is suitably a cylindrical plug 102 that is received into opening 76 of sleeve 78. Plug 102 has an outer flange 103 which is dimensioned to frictionally interfit with the opening 76 of the sleeve. The plug 102 suitably has an axial groove 104 configured and dimensioned to snugly accommodate cord 23. When cord 23 is placed in groove 104 and plug 102 is inserted into sleeve 78, the cord 23 is held fast, thereby adjusting and fixing the lamp assembly height "h." Preferably, there is an opening 105 under the groove 104 which extends along a portion of the length of the cylindrical plug 102. A string 160 may be threaded through opening 105, and at one end 162 tied to the plug 102. The other end 164 of the string 160 may be threaded through the T-joint 66 and fastened. This is especially useful in the classroom or home situation for preventing loss or misplacement of the plug 102 and for keeping parts together. It is not necessary, however, to include the string 160 for the invention to be operative. Other thin flexible materials may be used in place of string, for example, but not limited to, thread, wire, plastic.

Shade 34 is connected to open end 33 of housing 28. Shade 34 is suitably connected, for example, via an adapter 106 which threadedly fastens to housing end 33. Shade 34 has an opening 108 which is inserted over the open end 33 of housing 28. Adapter 106 has one end 110 that is threaded to be attached to complementary threads on open end 33 of housing 28. The other end 112 has a flange 114 which supports and holds shade 34 fast.

An advantage of the present invention is its cost effective construction. Virtually all the components of the invention are suitably constructed of conventional plumbing and electrical parts. For example, the components of stand 24 are suitably constructed of polyvinyl chloride piping and conventional polyvinyl chloride T- and elbow joints. By way of example, tubular members of stand 24 are suitably ¾-inch-diameter PVC piping although other commercially available conventional polymeric tubing is also suitable. The T-joints and the elbow joints are also suitably ¾ inch.

As such, the present invention is lightweight and compact compared to similarly sized lamps of conventional construction. A lamp in accordance with the present invention constructed, for example, with the ¾-inch PVC piping and joints has a weight of about 2 lbs. 6.5 oz. (1,110 g) (2 lbs. 15.5 oz. with bulb). The height of the lamp at its highest point is about 28 inches (70 cm). The length of the spreader bar is about 15 inches (37.5 cm), and the length of legs is about 12 inches (30 cm), thus creating space 79 as a rectangular space which is approximately 15 inches×12 inches with the spreader bar and legs at the periphery, defining three of the four sides. It is understood that other sized piping is equally suitable for construction of lamp 20.

The bulb housing 28 is suitably made of a conventional electrical part, i.e., a plastic socket with switch.

Shade 34 is suitably constructed of acrylic, is reflective on one surface, i.e., inner surface 41, and heat resistant. Bulb 30 is preferably a 30-watt, 120-volt fluorescent bulb with an adapter for a standard fixture, bulb 30 is most preferably circular in shape. Alternatively, an incandescent bulb is suitable; however, shade 34 must be constructed so as to withstand the greater heat output of an incandescent bulb.

Figure 16:
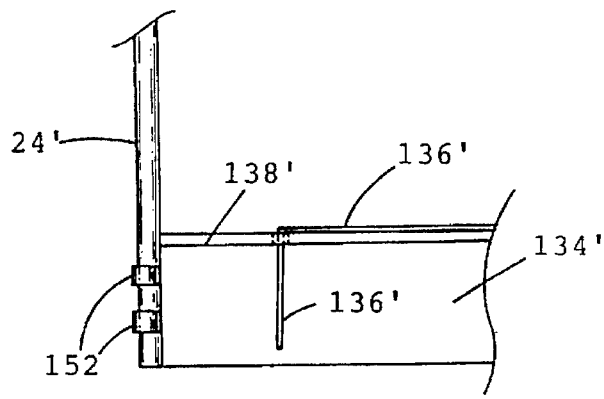
FIG. 16 is a partial side view of the combination of FIG. 15.
Figure 15:
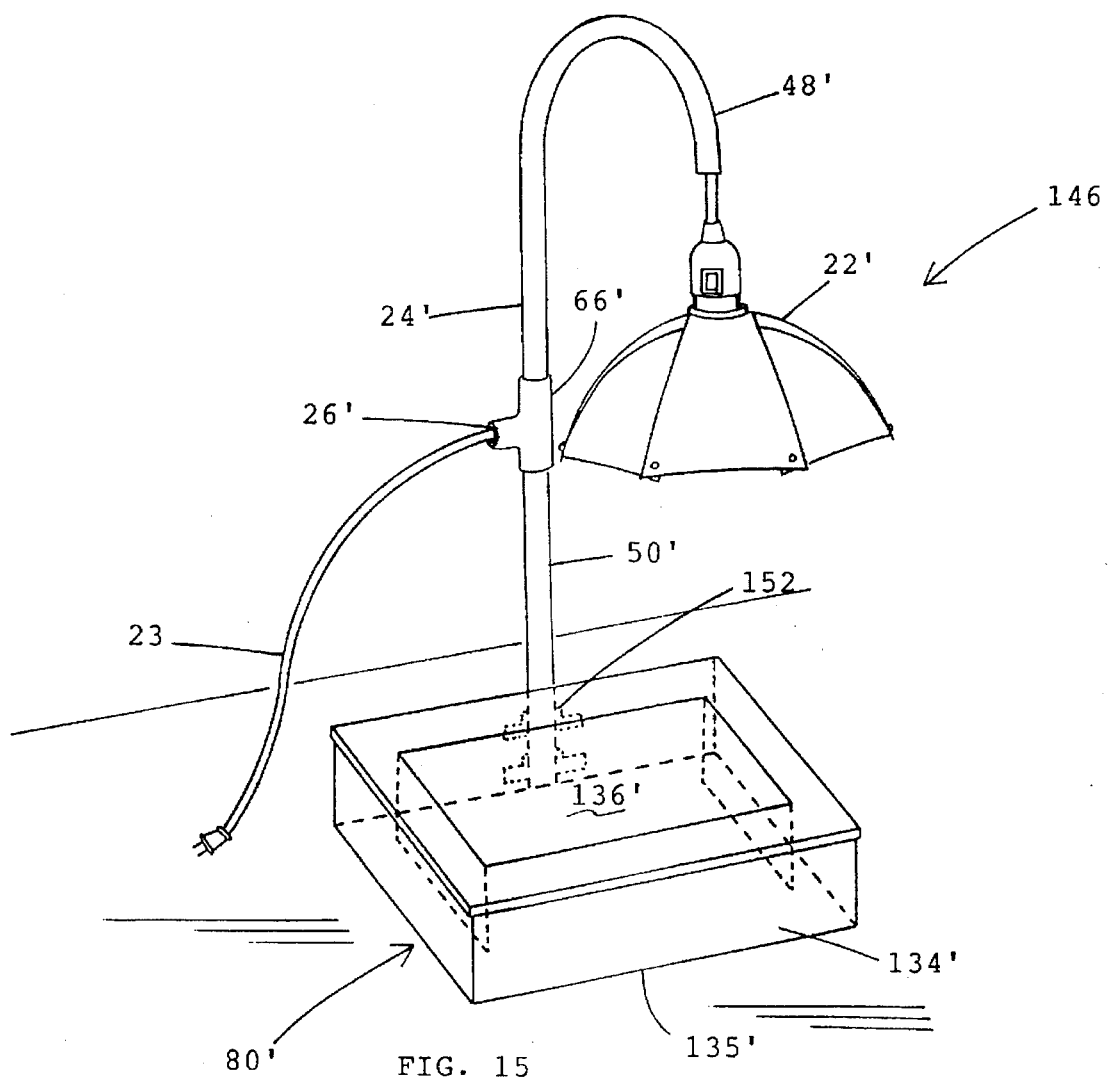
FIG. 15 is a combination compact horticultural lamp/ growing environment in accordance with the present invention.

It should be understood that unlike conventional lamps of similar size where the base is weighted to maintain balance, i.e., to maintain the lamp upright and stable, the width of the spreader and forward extension of legs in the lamp in accordance with the present invention, provide the appropriate balance to counter the weight and positioning of the lamp assembly. In the case of the combination embodiment of light and growing environment (as shown in FIGS. 15–16 and described hereinafter), the reservoir provides the counter weight and balance to the light assembly.

Figure 9:
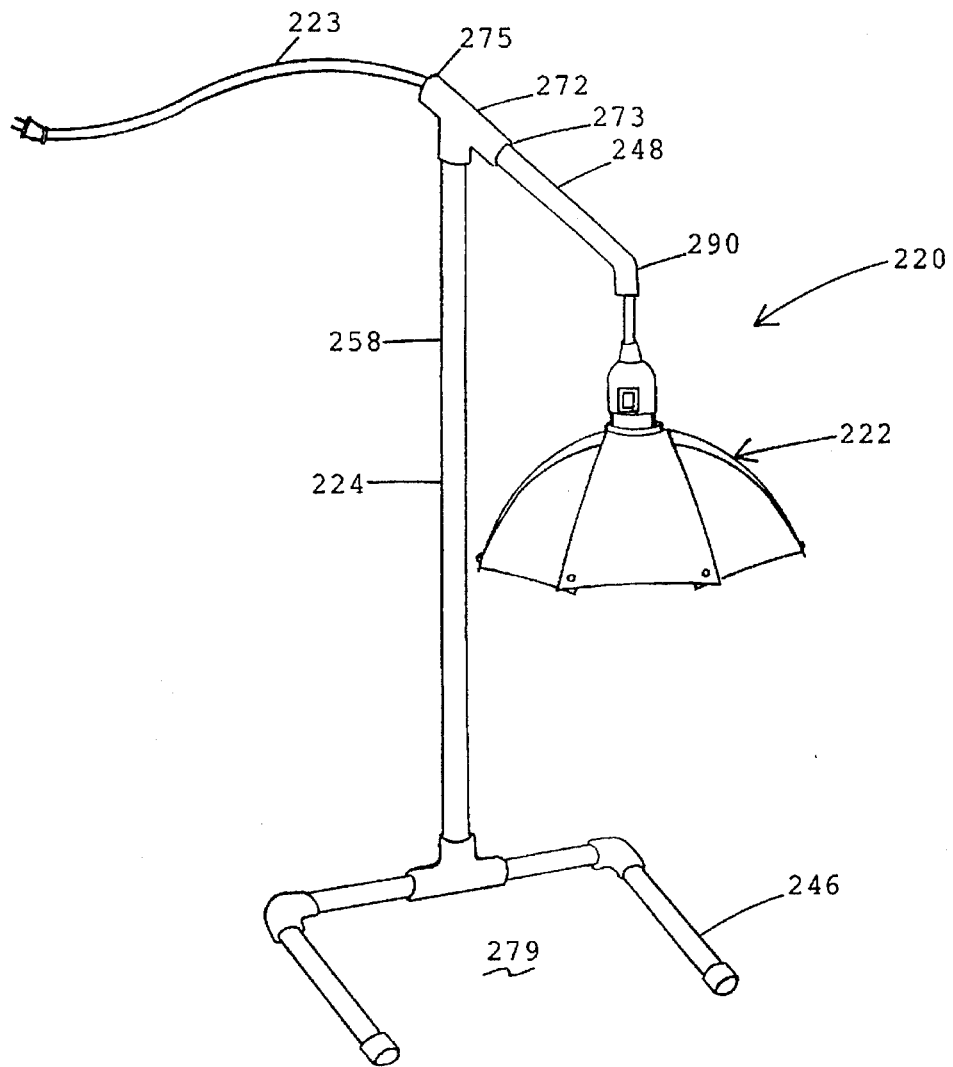
FIG. 9 is a perspective view of alternate embodiment of the lamp in accordance with the present invention.
Figure 9A:
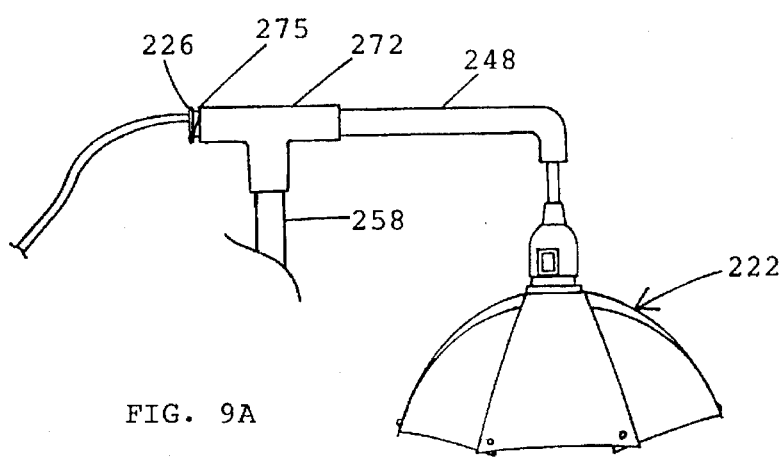
FIG. 9A is an alternate embodiment of the lamp of FIG. 9.
Figure 10:
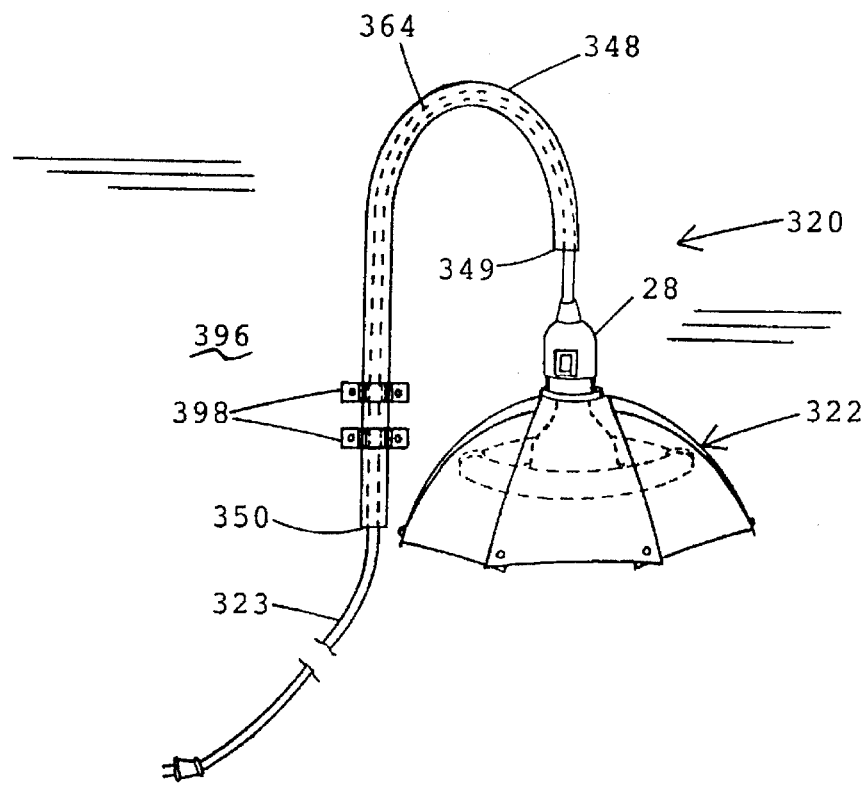
FIG. 10 is a side view of a third embodiment of the lamp in accordance with the present invention.
Figure 11:
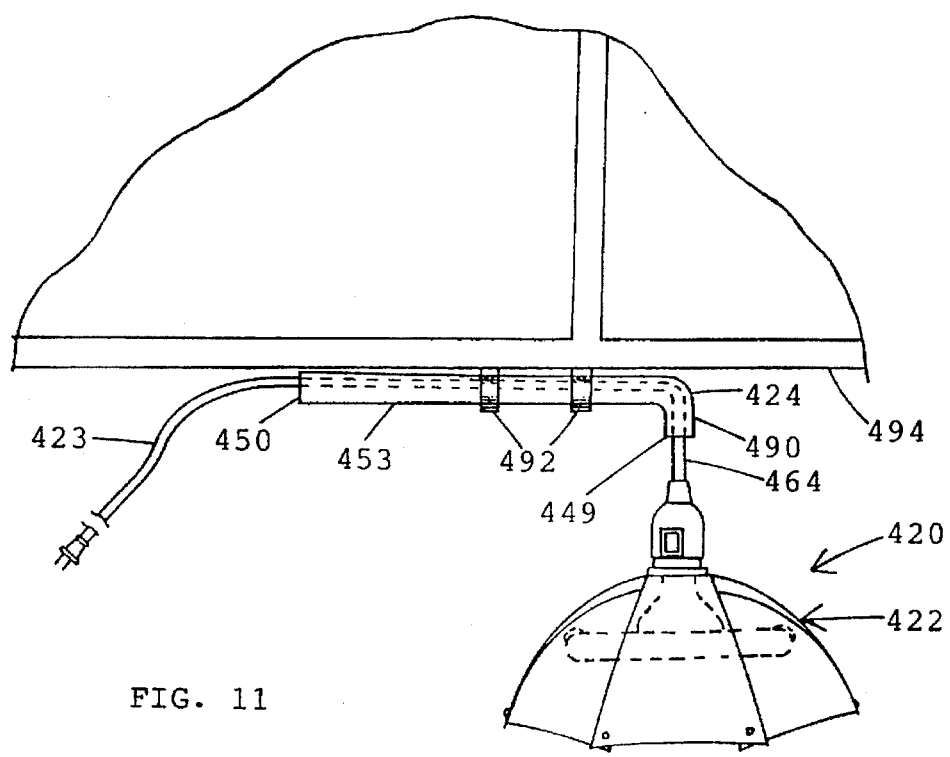
FIG. 11 is a side view of a fourth embodiment of the lamp in accordance with the present invention.

Referring now to FIGS. 9–11 where alternate embodiments of the lamp in accordance with the present invention are depicted. FIG. 9 shows a lamp 220 with an alternate design of a stand 224. As described hereinbefore for stand 24, stand 224 is tubular and includes a first section 248 and a second section 258. One end 273 of a T-joint 272 connects one end of section 248 to an end of section 258. A portion 264 of an electric power cord 223 is contained within section 248; cord 223 exits the stand 224 through an end 275 of T-joint 272. A lamp assembly 222 is pendant from the opposite end of section 248. Lamp assembly 222 is the same as lamp assembly 22 described hereinbefore. As described hereinbefore for stand 24, section 258 is perpendicular to base 246. T-joint 272 is oriented so that lamp assembly 222 illuminates a growing space 279 defined by base 246 and section 248 optionally has a curvilinear end portion 290 to direct the downward hanging of lamp assembly 222. FIG. 9A depicts an alternate embodiment of that depicted in FIG. 9. In the embodiment of FIG. 9A, a plug 226 plugs the open end of end 275 of T-joint 272, for holding fast cord 223.

Figure 10A:
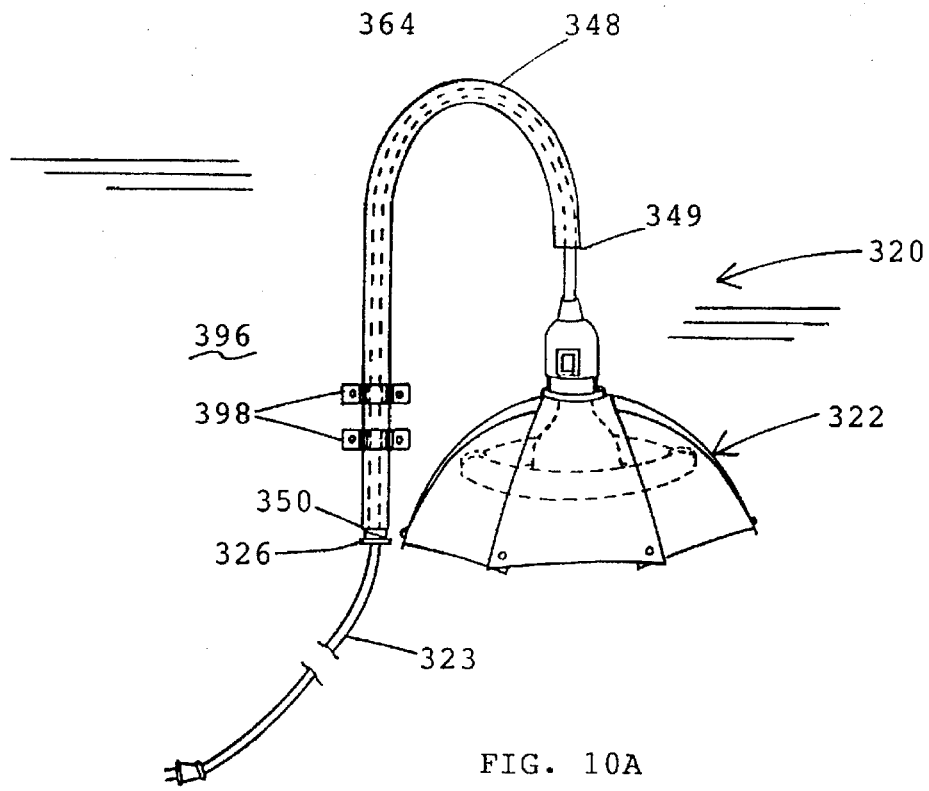
FIG. 10A is an alternate embodiment of the lamp of FIG. 10.

FIG. 10 depicts a lamp 320 which is wall-mounted. The housing includes an inverted J-shaped tube 348 through which an electric power cord 323 is passed. A portion 364 of cord 323 is contained within tube 348, and exits from one end 349 of tube 348. A lamp assembly 322 is pendant from end 349 by hanging by cord 323; cord 323 also exits from the other end 350 of tube 348. A lower portion of tube 348 is secured to a wall 396 with fasteners, e.g., brackets 398. A lamp assembly 322 is the same as lamp assembly 22 described hereinbefore. FIG. 10A depicts an alternate embodiment of that depicted in FIG. 10. In the embodiment of FIG. 10A, a plug 326 plugs the open end of end 350 of tube 348, for holding fast cord 323.

Figure 11A:
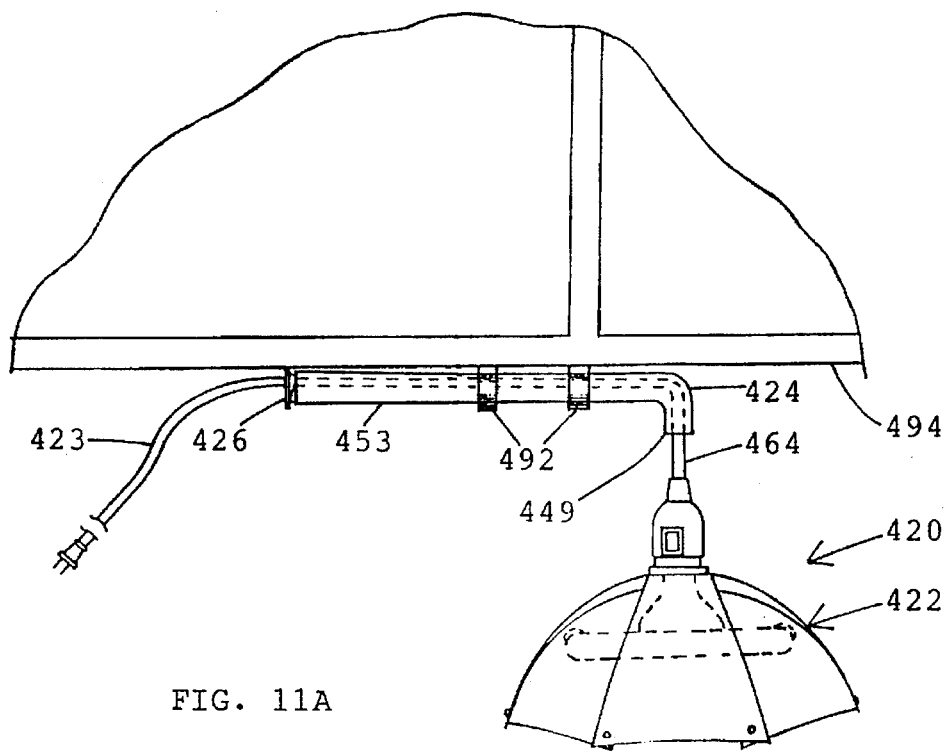
FIG. 11A is an alternate embodiment of the lamp of FIG. 11.

FIG. 11 depicts a lamp 420 which is mounted under a cabinet or counter 494. The housing includes a tube 424 through which an electrical power cord 423 is passed. One end of cord 423 exits tube 424 at one end 449. A lamp assembly 422 depends from end 449 by cord 423. The other end of cord 423 exits the other end 450 of tube 424. A portion 464 of cord 423 is disposed and contained within tube 424. Tube 424 optionally has a curvilinear end portion 490 to direct the downward hanging of lamp assembly 422 and has a leg 453 secured to the underside of cabinet or counter 494 by fasteners, e.g., brackets 492. The lamp assembly 422 is the same as lamp assembly 22 described hereinbefore. FIG. 11A depicts an alternate embodiment of that depicted in FIG. 11. In the embodiment of FIG. 11A, a plug 426 plugs the open end of end 450 of tube 424, for holding fast cord 423.

In another aspect, the present invention provides lamp 20 in kit form, to be readily assembled and disassembled by a user as need and space dictates. The ease of assembly and disassembly is particularly advantageous for the classroom setting and in other educational or home settings where storage space is limited and when the device is not in use. In kit form, as best seen in FIGS. 2–5, lamp 20 includes upper section 48, lower section 50, T-joint 66, spreader bar 82, legs 84, end caps 100, electrical cord 23 with end 36 attached to bulb housing 28, electrical plug 40, shade 34, adapter 106 and optionally, a plug 26. For convenience and stability, spreader bar 82 is suitably provided such that portions 86, T-joint 88 and elbow joints 96 and 98 are adhesively attached.

Lamp 20 may be constructed by way of example as follows: End 38 of cord 23 is inserted into end 56 of upper section 48 and pushed through until end 38 reaches end 58 of upper section 48. End 38 is then inserted into end 68 of T-joint 66 and pulled out sleeve 78. Electric plug 40 is attached to cord 23 in a known manner. If desired, plug 26 can be inserted into the opening of sleeve 78 for holding cord 23. End 68 of T-joint 66 is then inserted into end 58 of upper section 48. End 60 of lower section 50 is then inserted into end 70 of T-joint 66. Legs 84 are inserted into joints 96 and 98, respectively, and end caps 100 are placed over the ends 95 and 97, respectively, of legs 84. End 62 of lower section 50 is then inserted into opening 90 of T-joint 88.

Figure 7:
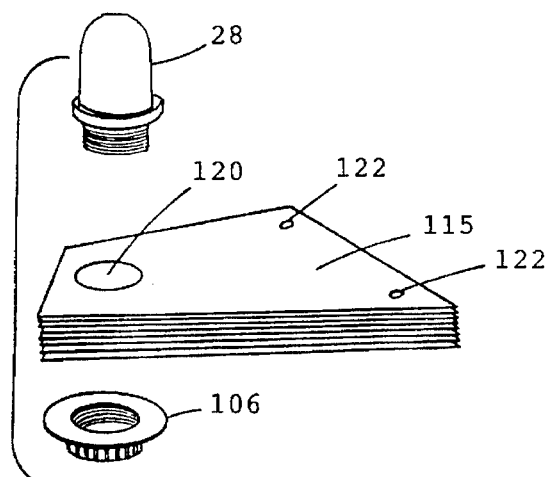
FIG. 7 is an exploded view illustrating the construction of the shade of FIG. 4 into the structure of the lamp housing.
Figure 8:
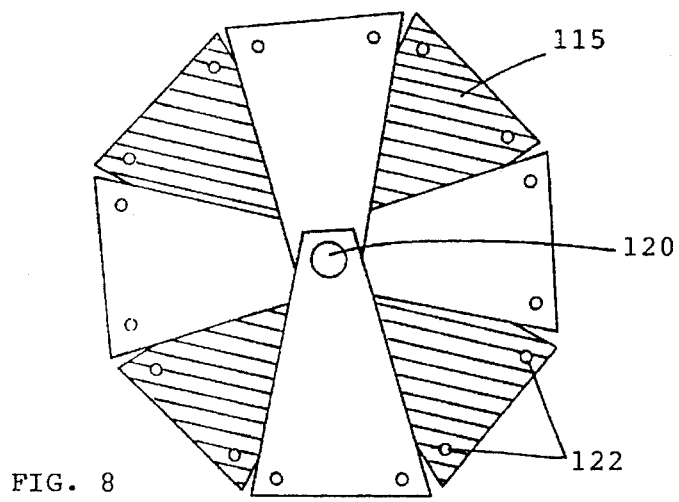
FIG. 8 is a top plan view of the shade of FIG. 4 with the panel spread circularly.

As with other components of lamp 20, shade 34 is readily assembled and disassembled, although optionally shade 34 is a molded plastic shape which is considered to be within the scope of the present invention. Shade 34 is constructed of a plurality of panels 115. As best seen in FIGS. 4–8, each panel 115 of shade 34 is wedge-shaped or substantially trapezoidal, i.e., each has a narrow end 116, a first side 117, a wide end 118 and a second side 119. Each panel 115 has an opening 120 located at the narrow end 116. The plurality of panels are superposed with each other so that openings 120 are aligned. As seen in FIGS. 7 and 8, the aligned panels are then inserted over end 33 of housing 28 and adapter 106 is threadedly connected to the end 33 of housing 28. The panels 115 are then spread annularly around the housing 28 in 360° fashion. The wide ends 118 of the panels 115 are then connected to each other. In the illustrated embodiment, best seen in FIGS. 4 and 5, panels 115 suitably have a pair of small openings 122, one in each corner of the wide end 118. Once the panels 115 are spread circularly around housing 28, the small openings 122 of adjacent panels 115 are superposed and a fastener such as a brad 124 is inserted into the superposed openings 122 and the prongs of each brad 124 spread apart to secure the panels adjacent to each other in a regular annular configuration.

Figure 17:
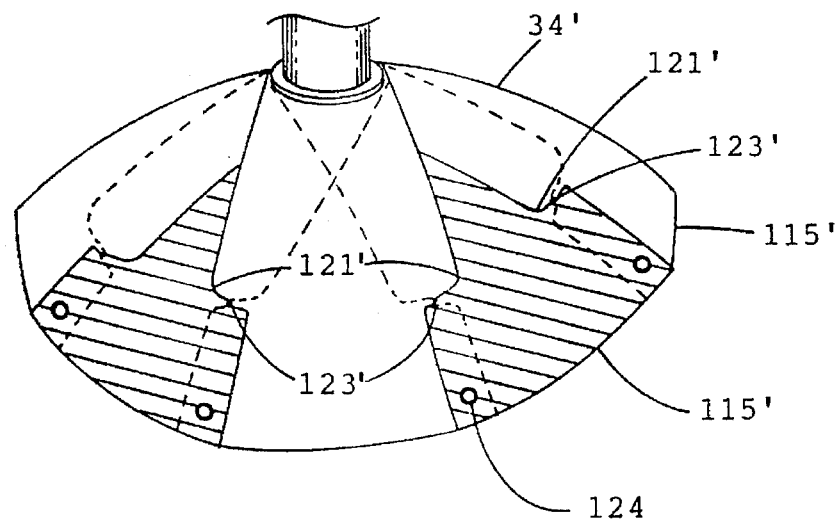
FIG. 17 is a partial view of the lamp of FIG. 1 showing the preferred embodiment of the shade design.
Figure 18:
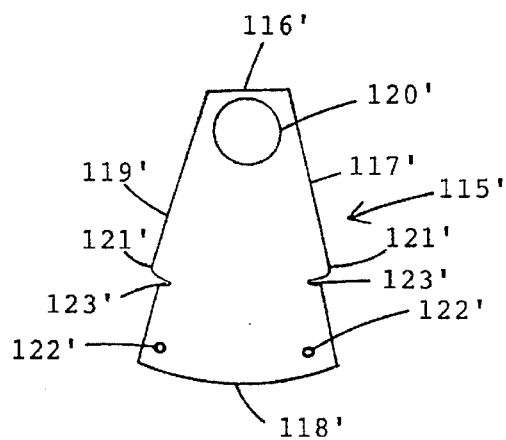
FIG. 18 is a top plan view of a shade panel of the preferred embodiment of the present invention.
Figure 19:
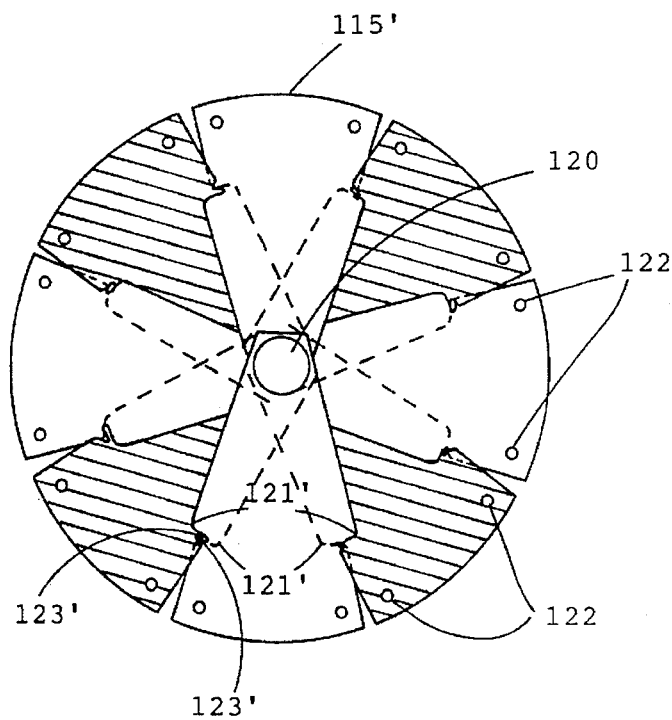
FIG. 19 is a top plan view of the shade panel of FIG. 17 with the panels spread circularly showing the side overlap.

A preferred embodiment of the reflector shade 34' is shown in FIGS. 17–19. Each panel 115' of the shade 34' is wedge-shaped having a narrow end 116', a first side 117', a wide end 118' and a second side 119'. Each panel 115' has an opening 120' located in the narrow end 116'. The first side 117' and the second side 119' each has a curved portion 121' and a notch 123'. Each panel 115' has two openings 122' at the corners of wide end 118'. The wide end 118' is preferably curved. The narrow end 116' preferably is linear. The plurality of panels are superposed with the first side of one panel interlaced with the second side of another panel so that the curved portion 121' of one panel overlap an adjacent panel and interfit with each other in the notched portions 123'. FIGS. 17 and 19 best show the overlapping and interfitting of the adjacent panels 115' to form the lamp shade 34'. The overlapped portions of the panels 115' are shown in hidden lines. The panels are fastened to the housing 28 and to each other as previously described.

It is understood that kits having the components necessary to construct the embodiments depicted in FIGS. 9–11 vary in the size and shape of housing 24 and are considered within the scope of the invention. In a kit for the embodiments of FIGS. 9 and 9A, the housing has two substantially linear tubular members 248, 258, a T-joint 272 and optionally, a plug 226. In a kit for the embodiments of FIGS. 10 and 10A, the housing has one substantially inverted J-shaped tubular member 348, an optional plug 326, and includes fasteners 398 for securing member 348 to a wall. In a kit for the embodiments of FIGS. 11 and 11A, the housing includes a substantially linear tubular member 424 with an optional curvilinear end portion 490, an optional plug 426, and includes fasteners 492.

Figure 12:
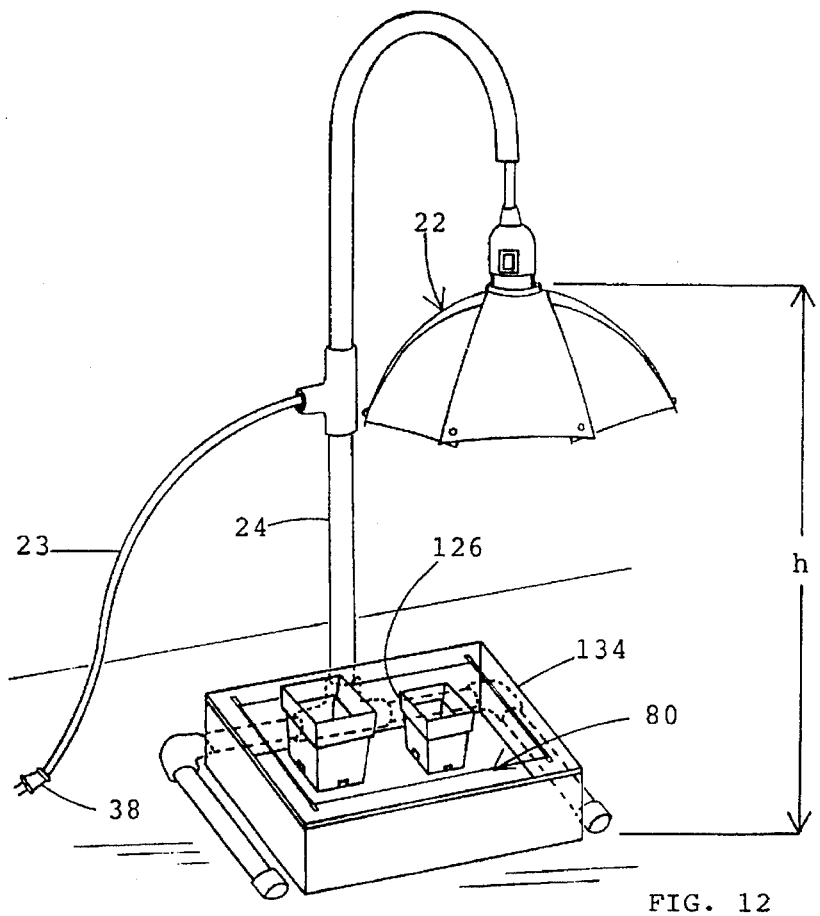
FIG. 12 is a perspective view of the lamp in accordance with the present invention in combination with a growing environment.
Figure 13:
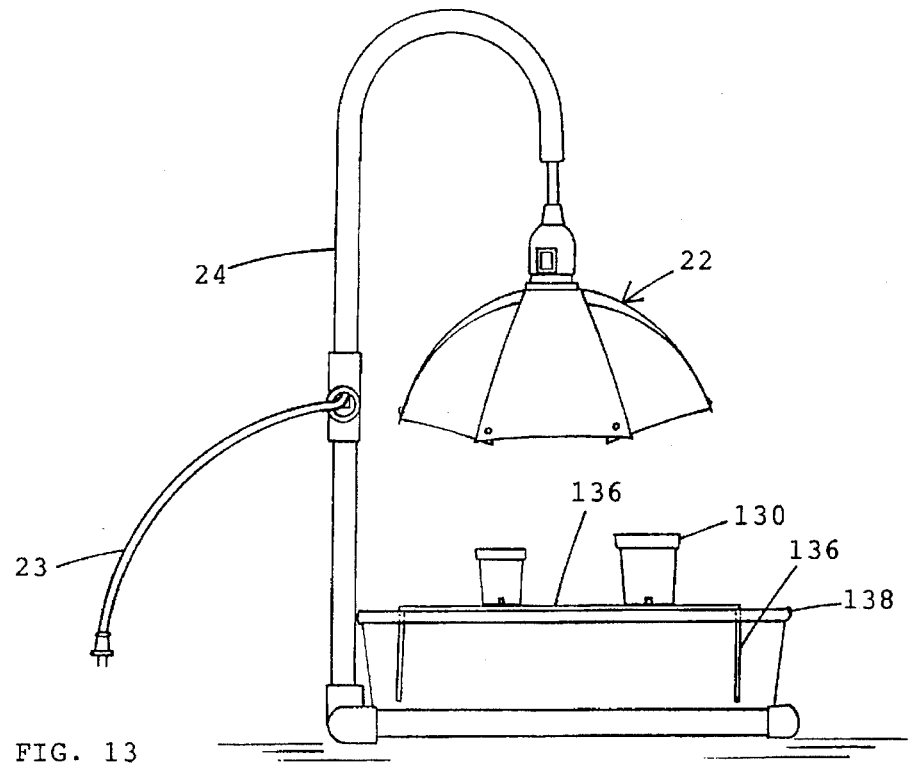
FIG. 13 is a side view of the lamp and the growing environment of FIG. 12.
Figure 14:
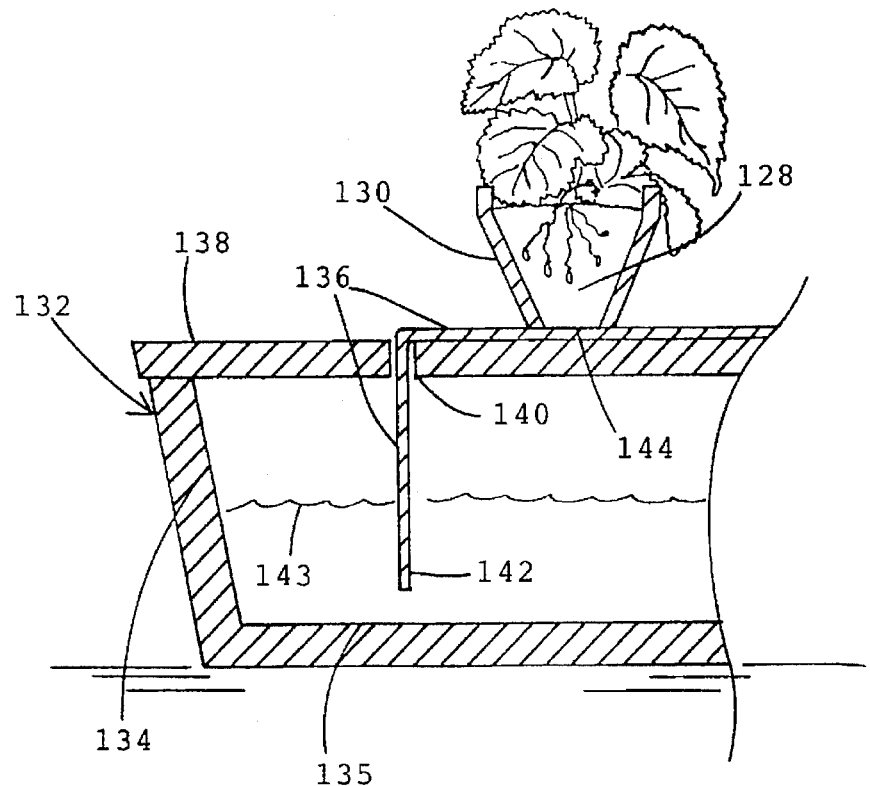
FIG. 14 is a partial sectional side view of the growing environment of FIG. 12.

In a further aspect, the kit of the present invention includes the growing environment 80 as shown in FIGS. 12–14. Growing environment 80 suitably includes a stock of seeds 126, a growing medium 128, e.g., soil, plant containers 130, and a watering system 132. In the illustrated embodiment, the watering system 132 includes a water reservoir 134 and a wicking mat 136, although other compact water systems are contemplated within the scope of the present invention. As best seen in FIGS. 12–14, growing environment 80 suitably fits within the legs 84 of base member 46. In the illustrated embodiment, reservoir 134 is configured and dimensioned rectangularly to fit space 79 defined by legs 84 and spreader bar 82. Reservoir 134 has a bottom tank 135 and a lid 138 having a pair of parallel spaced apart slits 140. The growing medium 128 is placed in each container 130 and the seeds 126 are placed in the medium 128 according to prescribed directions for the particular seeds. The lid 138 of reservoir 134 is placed on top of the tank 135, and the wicking mat 136 is placed on top of the lid 138. Ends 142 of wicking mat 136 are inserted into the slits 140 respectively so that they hang down into the water 143 in tank 135 of the reservoir 134. For best results, mat 136 is soaked in water prior to placement on the lid 138. The containers 130 have partial open or porous bottoms 144 through which water in the mat 136 is transferred to the growing medium 128 in the containers 130.

Reference is now made to FIGS. 15 and 16 depicting an alternate embodiment of the present invention. The invention in combination is a light and growing environment designated as 146. The combination 146 includes a lamp 20', a stand 24', a lamp assembly 22', a lamp adjuster 26', and a growing environment 80'. Lamp assembly 22' includes a housing with a standard light fixture therein, an electrical cord and a shade as previously described herein. Stand 24' includes an upper section 48' and a lower section 50' connected via a T-joint 66' also as described hereinabove. Growing environment 80' includes a water reservoir 134' having a water tank bottom 135'. Tank bottom 135' has a pair of vertically aligned clamps 152 which hold the bottom end 62' of lower section 50'. Lamp 20' is demountable as described hereinbefore making the combination 146 also demountable.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

I claim:

1. A horticultural lighting system for sustaining indoor plant growth, comprising: a lamp assembly, an electrical power cord, a housing, and lamp assembly height adjuster means;

said housing (i) configured to present said lamp assembly above a defined planter space, (ii) having an interior bore therethrough, (iii) having an exterior, and (iv) having a first opening and a second opening for communicating said bore to the exterior of said housing, said bore having a surface configured for receiving and passing said electrical power cord therethrough;

said electrical power cord (ii) disposed axially within said bore, and (ii) having a first end extending from said first opening and an opposite end extending from said second opening;

said lamp assembly (i) being vertically adjustable above said planter space, (ii) electrically connected to said electrical power cord and (iii) depending from said first opening by hanging from said electrical power cord;

said assembly adjuster means operatively associated with said second opening and said bore, for adjusting the length of said electrical power cord within said housing, and thereby for adjusting vertically the height of said assembly;

said housing and said assembly being demountable, wherein said means for adjusting vertically the height of said assembly comprises a frictional force between said electrical power cord and said bore surface such that a coefficient of sliding friction of said electrical power cord relative to said bore surface is sufficient so that said lamp assembly is maintained vertically above said planter space.

2. The system of claim 1, wherein said coefficient of sliding friction is greater than 0.2.

3. The system of claim 1, wherein said coefficient of sliding friction is greater than 1.0.

4. The system of claim 1, wherein said housing is substantially tubular.

5. The system of claim 4, wherein said housing has an arcuate portion having said first opening from which said lamp assembly depends through said power cord.

6. The system of claim 1, wherein said lamp assembly comprises a bulb housing having a base portion configured to cooperate with a standard light fixture for retaining a bulb and to effect electrical connection between said first end of said cord and said fixture, and a reflector lamp shade of a predetermined shape spaced to overlie said bulb.

7. The system of claim 6, wherein said bulb is a compact fluorescent bulb with an adapter for a standard fixture.

8. The system of claim 6, wherein said shade includes a plurality of demountable panels.

9. The system of claim 8, wherein said panels are made of acrylic.

10. A horticultural lighting system for sustaining indoor plant growth, comprising: a lamp assembly, an electrical power cord, a housing, and lamp assembly height adjuster means;

said housing (i) configured to present said lamp assembly above a defined planter space, (ii) having an interior bore therethrough, (iii) having an exterior, and (iv) having a first opening and a second opening for communicating said bore to the exterior of said housing, said bore having a surface configured for receiving and passing said electrical power cord therethrough;

said electrical power cord (ii) disposed axially within said bore, and (ii) having a first end extending from said first opening and an opposite end extending from said second opening;

said lamp assembly (i) being vertically adjustable above said planter space, (ii) electrically connected to said electrical power cord and (iii) depending from said first opening by hanging from said electrical power cord;

said assembly adjuster means operatively associated with said second opening and said bore, for adjusting the length of said electrical power cord within said housing, and thereby for adjusting vertically the height of said assembly;

said housing and said assembly being demountable, wherein said housing is uprightly freestanding;

wherein said housing includes an upright member and a base member;

wherein said upright member is tubular and has a lower linear tubular section and an upper inverted J-shaped tubular section, and said base member is tubular and is disposed perpendicular to said upright member;

said system further comprising a first connector for connecting said upper section to said lower section, and a second connector for said lower section to said base member.

11. The system of claim 10, wherein said first and second connectors are T-joints.

12. The system of claim 11, wherein said first T-joint has a leg defining a hollow sleeve opening, and said opposite end of said cord extends through said sleeve opening.

13. The system of claim 10, wherein said base member is substantially U-shaped.

14. A horticultural lighting system for sustaining indoor plant growth, comprising: a lamp assembly, an electrical power cord, a housing, and lamp assembly height adjuster means;

said housing (i) configured to present said lamp assembly above a defined planter space, (ii) having an interior bore therethrough, (iii) having an exterior, and (iv) having a first opening and a second opening for communicating said bore to the exterior of said housing, said bore having a surface configured for receiving and passing said electrical power cord therethrough;

said electrical power cord (ii) disposed axially within said bore, and (ii) having a first end extending from said first opening and an opposite end extending from said second opening;

said lamp assembly (i) being vertically adjustable above said planter space, (ii) electrically connected to said electrical power cord and (iii) depending from said first opening by hanging from said electrical power cord;

said assembly adjuster means operatively associated with said second opening and said bore, for adjusting the length of said electrical power cord within said housing, and thereby for adjusting vertically the height of said assembly; said housing and said assembly being demountable; wherein said housing is uprightly freestanding and includes an upright member and a base member; and wherein said base member includes a horizontally disposed spreader bar having a first end and an opposite end, and a pair of spaced apart parallel legs perpendicularly extending from and coplanar with said bar, one of said pair extending from said first end of said bar and the other of said pair extending from said opposite end of said bar; said bar and legs defining said planter space beneath said lamp assembly; said system further comprising a reservoir configured and dimensioned to fit within said planter space.

15. A horticultural lighting system for sustaining indoor plant growth, comprising: a lamp assembly, an electrical power cord, a housing, and lamp assembly height adjuster means;

said housing (i) configured to present said lamp assembly above a defined planter space, (ii) having an interior bore therethrough, (iii) having an exterior, and (iv) having a first opening and a second opening for communicating said bore to the exterior of said housing, said bore having a surface configured for receiving and passing said electrical power cord therethrough;

said electrical power cord (ii) disposed axially within said bore, and (ii) having a first end extending from said first opening and an opposite end extending from said second opening;

said lamp assembly (i) being vertically adjustable above said planter space, (ii) electrically connected to said electrical power cord and (iii) depending from said first opening by hanging from said electrical power cord;

said assembly adjuster means operatively associated with said second opening and said bore, for adjusting the length of said electrical power cord within said housing, and thereby for adjusting vertically the height of said assembly; said housing and said assembly being demountable; wherein said housing is uprightly freestanding and includes an upright member and a base member; and wherein said base member includes a horizontally disposed spreader bar having a first end and an opposite end, and a pair of spaced apart parallel legs perpendicularly extending from and coplanar with said bar, one of said pair extending from said first end of said bar and the other of said pair extending from said opposite end of said bar; said bar and legs defining said planter space beneath said lamp assembly; wherein said upright member further includes a lower section, an upper section, a first connector connecting said lower section to said upper section and a second connector for connecting said lower section to said base member; and wherein said base member further includes third and fourth connectors for connecting each leg respectively to said bar.

16. The system of claim 15, wherein said upright member and said base member are constructed of standard polyvinyl chloride plumbing piping, and said first, second, third and fourth connectors are standard polyvinyl chloride plumbing joints; said first and second connectors being standard T-joints.

17. A method of making a horticultural light system, comprising the steps of:

(a) connecting a pair of hollow tubes, one of said pair being an inverted J-shaped tube, the other of said pair being a linear tube;

(b) inserting an electric power cord into said inverted J-shaped tube;

(c) electrically connecting one end of said electrical power cord to a bulb housing having a base portion configured to cooperate with a standard light fixture for retaining a light bulb;

(d) attaching a reflector lamp shade of a predetermined shape to said housing to overlie said bulb;

(e) providing a connector having an opening, said connector connected between said tubes so that the other end of said cord exits said one of said pair of hollow tubes through said opening;

(f) providing sufficient friction between said cord and said inverted J-shaped tube to hold fast said cord; and (g) connecting perpendicularly said linear tube with a base.

18. The method of claim 17, wherein step (a) includes connecting said inverted J-shaped tube to said linear tube via said connector, wherein said connector is a T-joint and wherein said opening is an open sleeve of said T-joint, and exiting the other end of said electrical power cord through the open sleeve of said T-joint.

19. The method of claim 17, wherein said base is formed by connecting a pair of tubes in parallel to each other, one of said pair at one end of a linear spreader bar and the other of said pair at the other end of said spreader bar, and said linear tube is connected to said spreader bar via a T-joint.

20. The method of claim 17, wherein said shade is formed by assembling a plurality of generally qualdrilaterally shaped panel, each panel having a narrow end with an opening and an opposite wide end, each said wide end having two wide end corners; inserting said bulb housing into said narrow end opening and securing said panels to said housing; spreading circularly said panels; and attaching said panels to one another at the wide end corners.

21. The method of claim 20, wherein each of said panels have opening in each wide end corner, and respective corners are overlapped and said panels are attached together with brads.

* * * * *